May 30, 1944.  W. O. BECHMAN  2,349,898
LUBRICATING MEANS
Filed June 16, 1941  2 Sheets-Sheet 1
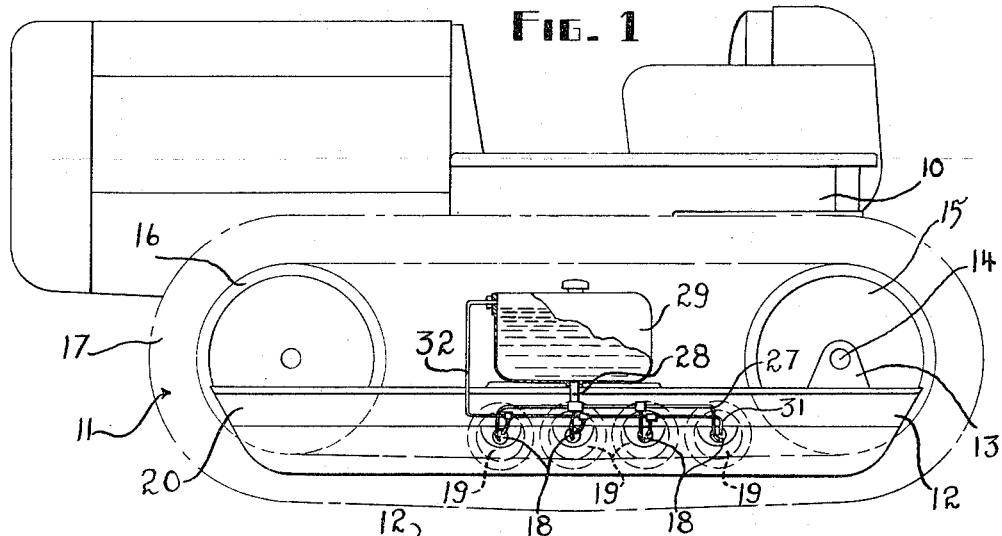
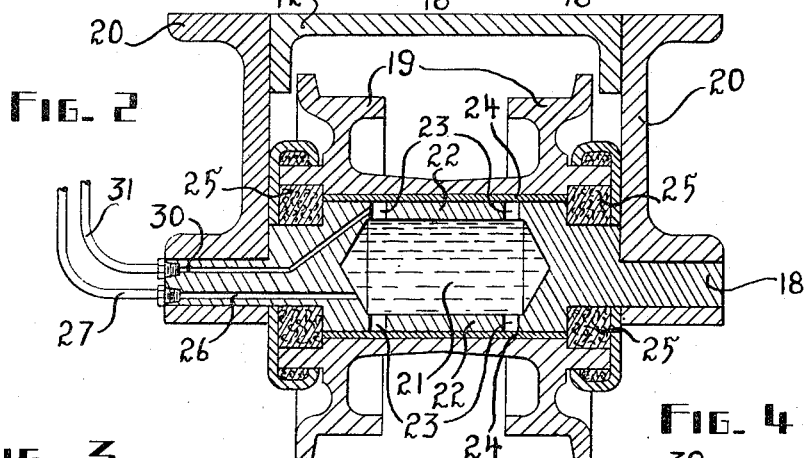
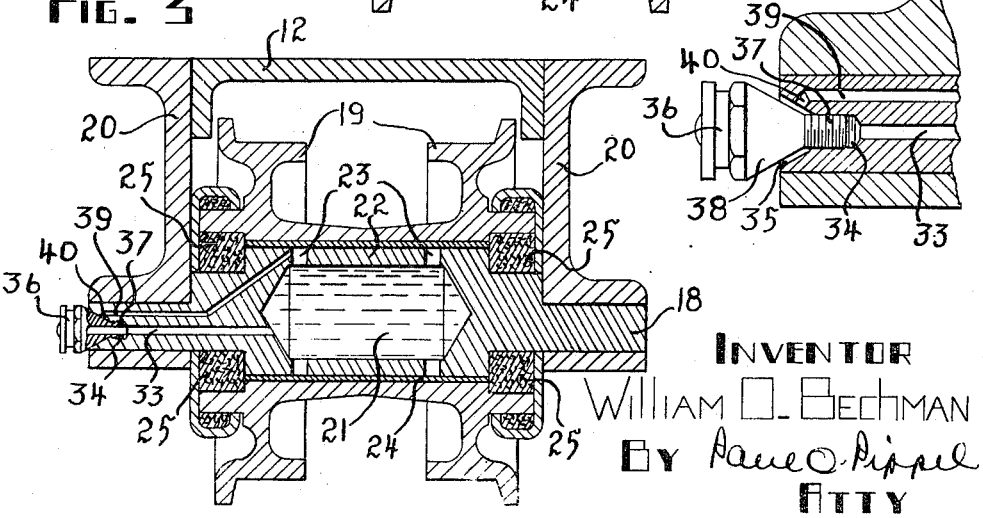
INVENTOR
William O. Bechman
By Paul O. Pippel
ATTY May 30, 1944.  W. O. BECHMAN  2,349,898
LUBRICATING MEANS
Filed June 16, 1941   2 Sheets-Sheet 2

INVENTOR
William O. Bechman
By Paul O. Pippel
Atty

Patented May 30, 1944

2,349,898

UNITED STATES PATENT OFFICE 2,349,898

LUBRICATING MEANS

William O. Bechman, Chicago, Ill., assignor to International Harvester Company, a corporation of New Jersey Application June 16, 1941, Serial No. 398,206

1 Claim. (Cl. 308—103)

This invention relates to a lubricating system and, more particularly, to a lubricating system in which means are provided for lubricating a bearing surface in conjunction with means providing for a return or venting of the lubricant from the bearing surface.

One particular instance in which the invention finds its greatest utility is in connection with the lubrication of the track rollers of a track-type tractor. In such a tractor, a tractor body is carried between a pair of track-laying mechanisms, each of which comprises a pair of longitudinally extending track frames carrying a plurality of track rollers. Each track roller is mounted on a shaft disposed horizontally of the track frame. A substantial part of the weight of the tractor is carried on the track rollers, which engage the track chains which in turn rest upon the ground.

Because of the unusual conditions under which a track-type tractor is operated, extraordinary lubrication problems arise. Most of the failures of the track rollers to receive proper lubrication can be traced to the neglect on the part of the person servicing the tractor to determine correctly whether the rollers have received the proper supply of lubricant. This neglect is due in most instances to the inability of the service man to inspect the rollers, with the result that the tractor is often operated while certain of the rollers have received little or no lubricant.

One particular problem attendant upon the lubrication of track rollers is that certain of the rollers lose their lubricant because of failure of the track seals to maintain the lubricant therein against the expansion of the lubricant caused by overheating of the rollers. Accordingly, certain of the rollers become worn out before others and require either replacement or special care in connection with the lubrication thereof in the event that immediate replacement is not possible. One of the usual methods for lubricating rollers involves the supply of lubricant for a certain period of time, after which period it is assumed that the roller is properly lubricated. It will be seen, however, that a roller which is nearly worn out will require greater quantities of lubricant than a roller in better condition.

The invention contemplates and has for its principal object the provision of means insuring the proper lubrication to the track rollers of a track-type tractor.

An important object is the provision of a lubrication system in which the rollers will receive equal quantities of lubricant regardless of their condition of wear.

Another important object is the provision of means by which the person servicing the rollers may readily ascertain whether the roller has received sufficient lubricant.

Another object of the invention is the provision on the tractor of a lubricant reservoir having conduits leading to the rollers, each roller in turn being provided with a return conduit for venting the roller to accommodate expansion of the air and lubricant within the roller upon overheating of the roller.

Another object is to utilize a lubricant-containing part of the tractor as a supply means or reservoir. Specifically, an object is to utilize the transmission casing of the tractor as a reservoir.

Another object is the provision of a roller construction in which the shaft is provided with supply and return passages, the supply passage being provided with a lubricant-supply fitting which serves also to cover and uncover the return passage, whereby the person servicing the roller may perceive the lubricant escaping from the return passage.

A further understanding of the foregoing and other desirable objects and features of the invention may be had from the following detailed description, taken in conjunction with the accompanying sheet of drawings, in which:

Figure 1 is a side elevational view, showing a track-type tractor including a preferred form of the invention as applied to the problem of lubricating the track rollers of the tractor;

Figure 2 is an enlarged sectional view of one of the track rollers shown in Figure 1;

Figure 3 is a sectional view similar to that contained in Figure 2, and showing that form of the invention in which the track rollers are lubricated individually;

Figure 4 is an enlarged fragmentary view of an end portion of the structure shown in Figure 3, illustrating the manner in which the lubrication fitting is released to expose the lubricant-return passage;

Figure 5:
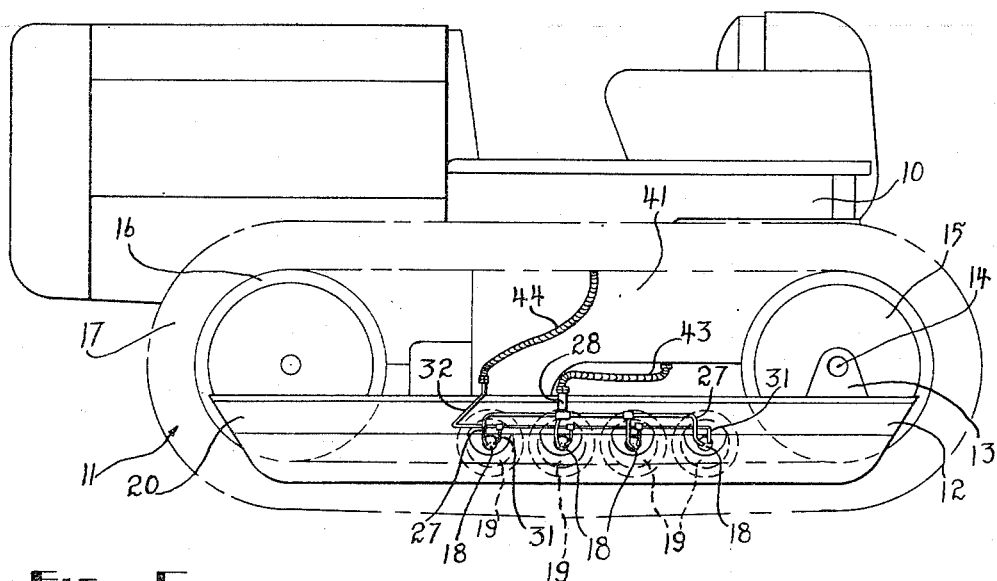
Figure 5 is a view similar to that in Figure 1, but which illustrates a modified form of the invention in which the tractor transmission casing is utilized as the lubricant-supply reservoir; and, Figure 6 is an enlarged fragmentary and sectional view illustrating the lubricant-supply connections to the casing.

Although the invention has been illustrated in connection with the track rollers of a track-type tractor, it is to be understood that, in its broader aspects, the invention embodies fundamental principles that are capable of application to other structures and uses, and accordingly it is not desired that the invention be limited to the preferred forms illustrated and described.

The tractor chosen for the purposes of illustration, as shown in Figure 1, comprises generally a longitudinal main frame 10 carried on a pair of transversely spaced track mechanisms, only one of which is shown, indicated generally at 11. Each track mechanism includes a longitudinally extending track frame 12, connected at its rear end by a bracket 13 to a transverse shaft 14 on which is carried the tractor drive wheel or sprocket 15. The front end of the track frame is associated in the usual manner with a front idler wheel 16, and a track chain 17 is trained about the wheels 15 and 16.

The track frame 12 carries a plurality of longitudinally spaced, horizontally disposed supports in the form of roller shafts 18, each of which carries a track roller 19. The rollers 19 engage and ride on the inner portions of the track chain 17, and support the tractor in the usual manner.

A typical roller construction is shown in detail in Figure 2, wherein the track frame 12 is shown as comprising a transverse member which cross-connects a pair of longitudinally extending channels 20. The track roller shaft 18 spans the lower portions of the channels 20, and is rigidly and non-rotatably carried thereby, the outer ends of the shaft being reduced and flattened for that purpose. In the particular form of construction illustrated, the central portion of the shaft 18 is enlarged to form a pocket or chamber 21 to provide means for receiving a quantity of lubricant. The chamber is formed in the shaft by a central cylindrical portion including a cylindrical wall 22 which is provided with a plurality of openings or bores 23 communicating with a bearing surface provided between the outer cylindrical surface of the central shaft part and a cylindrical bushing 24. The bushing 24 carries a track roller 19. Opposite end portions of the roller are provided with sealing means 25 which may be of any suitable construction.

The shaft 18 is provided with a generally axially directed bore 26 which communicates between one end of the shaft and the lubricant chamber 21. To this bore or passage is connected a conduit or supply line 27, leading to a common delivery pipe 28 which is associated with the lower portion of a lubricant reservoir in the form of a tank 29 carried on the track frame 12. It will be understood that there is a plurality of conduits 27, one for each of the rollers 19. The means just described provides for an adequate and equalized supply of lubricant to the rollers.

It was previously stated that the track rollers were subject to overheating, under which conditions the lubricant and air in the chambers 21 expanded to a comparatively great extent, with the result that the seals, such as the seals 25, were adversely affected. In order that these conditions may be overcome, the present invention contemplates means for venting the chambers 21. To this end, each shaft 18 is provided with a second bore or passage 30, communicating at one end with the chamber 21 (through an opening 23), and at its other end with the upper portion of the lubricant reservoir 29. The latter connection is made by means of a conduit 31 leading to a common conduit 32 which is in turn connected to an upper portion of the tank 29. As shown in Figure 1, each of the shafts 18 is provided with a similar conduit 31.

In Figure 3 is illustrated a roller construction which contains provision for individual lubrication of the roller. In so far as the parts of the track frame and roller construction are identical to those shown in Figure 2, corresponding reference characters will be applied. In this figure the shaft 18 contains a lubricant supply passage 33 which is enlarged adjacent the end of the shaft to provide a threaded portion 34. At the extreme end of the shaft adjacent the threaded portion 34, the passage 33 is further enlarged or countersunk to provide a conical seat 35. A lubricant supply element or means in the form of a lubricant fitting 36 is carried by the shaft 18. This fitting has a threaded end 37 threaded into the threaded bore 34, and includes further a conical portion 38 adapted to fit the conical seat 35 at the end of the passage 33. A second passage 39 is disposed in the shaft 18 and has one end in communication with the lubricant chamber 21 (through an opening 23). The other end of the passage 39 leads directly to the conical seat 35 at the end of the passage 33, as indicated generally at 40. As shown in Figure 3, the fitting 36 is normally threaded tightly into the threaded bore 34, so that the conical portion 38 of the fitting tightly engages the seat 35. When the fitting is in this position, the outer end 40 of the passage 39 is closed.

Figure 6:
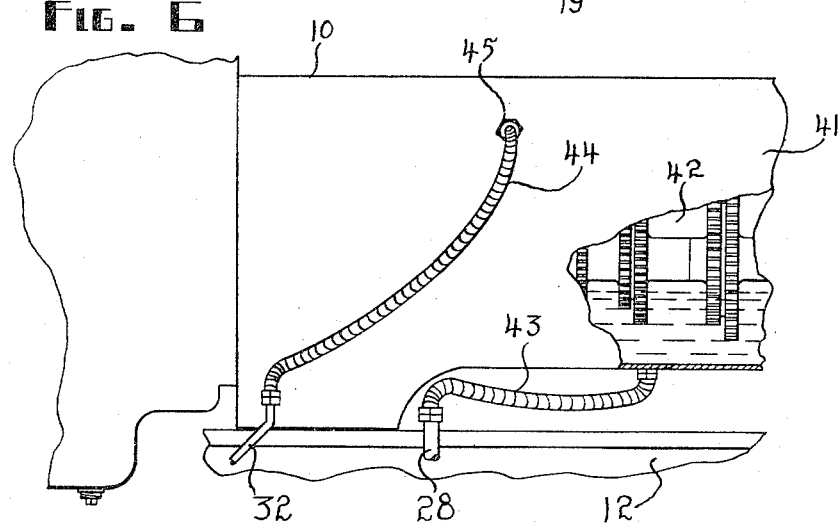

In the modified form of construction illustrated in Figures 5 and 6, the invention in that respect consists of the utilization of a gear housing as the reservoir from which lubricant is supplied to the tractor rollers. In so far as the general tractor construction illustrated in Figure 5 accords with that shown in Figure 1, the reference characters designating the parts are the same.

As shown in Figure 6, an intermediate portion of the tractor body 10 consists of the usual transmission gear housing 41 which forms a chamber 42 adapted to contain a supply of lubricant to the level indicated. Lubricant supply means is connected between the gear housing and the track roller and preferably takes the form of a flexible conduit or hose 43 which is connected at one end to a point in the housing below the lubricant level, and, at its other end, to the common delivery pipe 28 which is connected by means of the plurality of conduits 27 to the passages 26 in the track roller shafts 18. The conduit is preferably flexible because of the relative movement between the tractor body and the track frames. Means is provided for venting the lubricant-containing pockets 21 in the shafts 18 to the chamber 42 in the transmission housing 41, and this means preferably takes the form of a flexible conduit 44 connected at one end, as at 45, to the gear housing and at its other end to a common conduit 32 which is connected through the plurality of conduits 31 to the passages 30 in the track roller shafts 18. The connection 45 of the conduit 44 to the transmission housing is above the lubricant contained in the housing. In this respect the principle of the invention herein illustrated is similar to that peculiar to the construction illustrated in Figure 1; that is to say, the venting conduit opens to a portion of the reservoir above the level of the lubricant.

In the use of the construction illustrated in

Figures 1 and 2, the reservoir 29 is filled with lubricant to the level indicated. By this means an equal supply of lubricant is insured to each of the rollers 19, assuming that these rollers are in perfect condition. In the event that any one or more of the rollers is worn to a greater extent than any of the others, that roller or rollers will receive an additional supply of lubricant necessary to accommodate the differences due to its worn condition. Inasmuch as the conduits 30 and 31 provide for venting of the chambers 21 back to the tank 29, the supply of lubricant will not be obstructed by air and trapped in the pockets or chambers 21 or in other parts of the system. It has been found, in the operation of tractors of the type illustrated, that the rollers after becoming overheated are often subjected to operating conditions which cause a sudden chilling of the rollers. Such chilling occurs, for example, when the tractor is driven through water deep enough to contact the rollers. Because of the heat generated before chilling, the chambers 21 contain a certain volume of expanded air and lubricant. This volume immediately contracts upon chilling of the roller with the result that the water is drawn in around the seals 25. Because of the venting provision in the preferred construction illustrated, there is no opportunity for the lubricant and air to form an expanded volume in the chambers 21. Consequently, there is little or no contraction of air vapor or lubricant when the rollers are chilled, and hence there is little or no suction created on the seals 25. Moreover, because of the continuous supply of lubricant from the reservoir 29, there will be available quantities of oil sufficient to fill the space vacated by whatever contraction of air or vapor does occur.

In the use of the construction illustrated in Figures 3 and 4, lubricant is supplied to the chamber 21 by attaching to the lubricant fitting 36 a lubricant supply device or lubricant gun of any suitable type. However, before the lubricant is supplied, the fitting 36 is loosened so that the conical portion 38 is displaced from the seat 35 at the outer end of the passage 33, as is shown in Figure 4, thus exposing the end 40 of the passage 39. Now, when the lubricant is supplied through the passage 33, the chamber 21 can be completely filled. Since the end 40 of the passage 39 is open, the incoming lubricant will force out the air which heretofore had been trapped within the roller. After a continued supply of lubricant has been injected into the roller, the excess or overflowing lubricant will be visible around the fitting 36, this lubricant escaping or being discharged from the chamber 21 via the passage 39 and the space between the seat 35 and the conical portion 38 of the fiting. After this excess lubricant becomes visible, the fitting 36 is tightened and again securely seals the passages 33 and 39 against the entrance of dirt and the like and against the escape of lubricant.

Inasmuch as the lubricant is visible at the outer end of the shaft 18, the person lubricating the rollers can readily determine whether the chambers 31 are completely filled. Since these chambers are of a calculated size adapted to contain a supply of lubricant sufficient for a certain period of operation, it will be seen that the simple expedient which enables a positive filling of the rollers eliminates the problems heretofore experienced in prior constructions.

The functional characteristics of the lubricating system illustrated in Figures 5 and 6 are substantially identical because of the system illustrated in Figures 1 and 2, the only difference being in the source of lubricant supply. Since these two modifications are very similar in use and operation, it is unnecessary to particularize the use and operation of the modification shown in Figures 5 and 6.

As previously stated, the principles of the present invention are applicable in many instances outside the particular field in which the invention has been herein illustrated. It will be appreciated also that only preferred forms of the invention have been illustrated and described and that numerous modifications and alterations may be made therein without departing from the spirit and scope of the invention as defined in the appended claim.

What is claimed is:

In the combination, a fixed shaft having an internal chamber having perforate outer walls adapted to receive fluid and including upper and lower portions, said fixed shaft having a fluid supply conduit leading to the lower portion of the chamber, a fluid supply fitting connected with said conduit and movable with respect to said fixed shaft, said chamber including an overflow outlet conduit at its upper portions to permit escape of fluid from the chamber, both of said conduits terminating at one end of the fixed shaft and lying substantially parallel one to the other, and means normally closing said outlet conduit and operable by movement of the supply fitting with respect to the fixed shaft to open said outlet.

WILLIAM O. BECHMAN.